(12) United States Patent
Lin

(10) Patent No.: US 9,705,179 B2
(45) Date of Patent: Jul. 11, 2017

(54) ANTENNA STRUCTURE AND WIRELESS COMMUNICATION DEVICE USING SAME

(71) Applicant: Chiun Mai Communication Systems, Inc., New Taipei (TW)

(72) Inventor: Yen-Hui Lin, New Taipei (TW)

(73) Assignee: Chiun Mai Communication Systems, Inc., New Taipei (TW)

(*) Notice: Subject to any disclaimer, the term of this patent is extended or adjusted under 35 U.S.C. 154(b) by 116 days.

(21) Appl. No.: 14/566,948

(22) Filed: Dec. 11, 2014

(65) Prior Publication Data
US 2015/0180113 A1 Jun. 25, 2015

(30) Foreign Application Priority Data

Dec. 23, 2013 (CN) .......................... 2013 1 0713082

(51) Int. Cl.
*H01Q 1/24* (2006.01)
*H04M 1/02* (2006.01)
(52) U.S. Cl.
CPC ............ *H01Q 1/243* (2013.01); *H04M 1/026* (2013.01)
(58) Field of Classification Search
CPC .................................................... H01Q 1/243

USPC .......................................... 343/702, 850, 860
See application file for complete search history.

(56) References Cited

U.S. PATENT DOCUMENTS

| 6,768,472 B2 * | 7/2004 | Alexopoulos | H03H 7/40 330/144 |
| 7,079,079 B2 * | 7/2006 | Jo | H01Q 1/243 343/700 MS |
| 2009/0153423 A1 * | 6/2009 | Dinallo | H01Q 1/243 343/767 |
| 2012/0262354 A1 * | 10/2012 | He | H01Q 1/243 343/767 |

* cited by examiner

*Primary Examiner* — Dameon E Levi
*Assistant Examiner* — Hasan Islam
(74) *Attorney, Agent, or Firm* — Steven Reiss

(57) ABSTRACT

An antenna structure includes a feed portion, a ground portion, a connecting portion, a first metallic sheet, a second metallic sheet, and a coupling portion. The connecting portion is electrically connected to the feed portion. The first metallic sheet is electrically connected to the ground portion. The second metallic sheet is spaced apart from the first metallic sheet and is electrically connected to the connecting portion. The coupling portion is coupled to the connecting portion and spaced apart from the first metallic sheet.

12 Claims, 5 Drawing Sheets

ANTENNA STRUCTURE AND WIRELESS COMMUNICATION DEVICE USING SAME

CROSS-REFERENCE TO RELATED APPLICATIONS

This application claims priority to Chinese Patent Application No. 201310713082.X filed on Dec. 23, 2013, the contents of which are incorporated by reference herein.

FIELD

The subject matter herein generally relates to an antenna structure and a wireless communication device using the antenna structure.

BACKGROUND

Antennas are important elements of wireless communication devices, such as mobile phones or personal digital assistants. Many wireless communication devices further employ metal housings for improving heat dissipation or other purposes.

BRIEF DESCRIPTION OF THE DRAWINGS

Implementations of the present technology will now be described, by way of example only, with reference to the attached figures.

DETAILED DESCRIPTION

Figure 1:
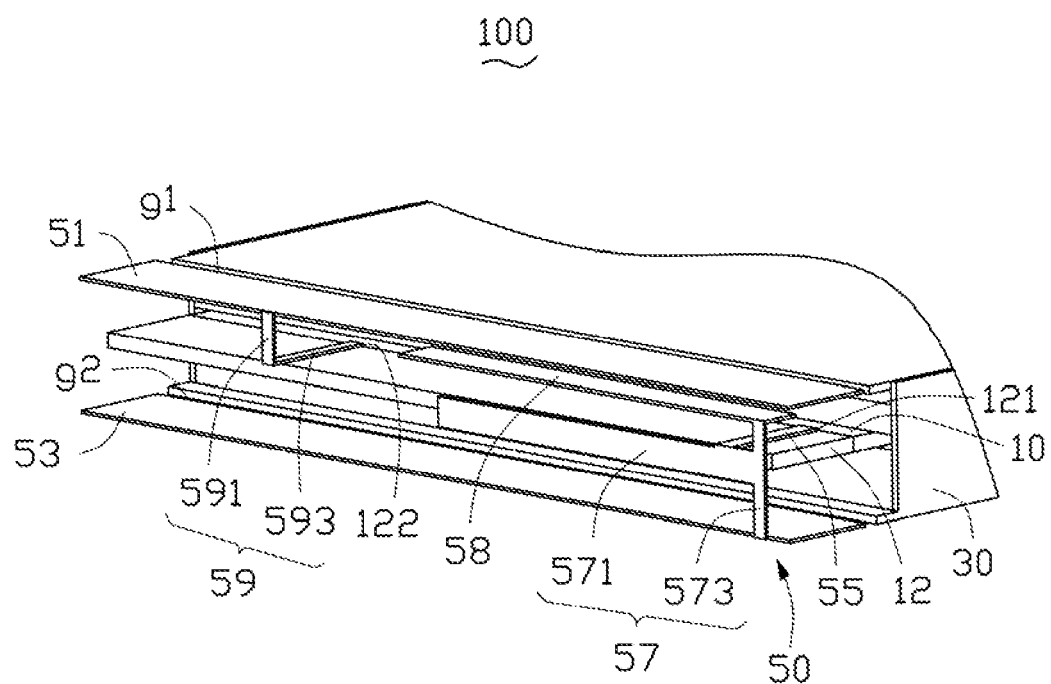
FIG. 1 is an isometric view of an embodiment of a wireless communication device employing an antenna structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

FIG. 1 illustrates an embodiment of a wireless communication device 100. The wireless communication device 100 can be a mobile phone or a personal digital assistant, for example. The wireless communication device 100 includes a baseboard 10, a housing 30, and an antenna structure 50. The housing 30 surrounds an exterior of the baseboard 10. The antenna structure 50 is positioned on the baseboard 10 and is spaced apart from the housing 30.

The baseboard 10 can be a printed circuit board (PCB) of the wireless communication device 100. The baseboard 10 forms a keep-out-zone 12. The purpose of the keep-out-zone 12 is to delineate an area on the baseboard 10 in which other electronic components (such as a camera, a vibrator, a speaker, etc.) cannot be placed. In this embodiment, the keep-out-zone 12 is disposed on an end of the baseboard 10. The keep-out-zone 12 has a size of about 60 mm by about 7.5 mm. The keep-out-zone 12 forms a feed pin 121 and a ground pin 122. The feed pin 121 is configured to provide current to the antenna structure 50. The ground pin 122 is configured to ground the antenna structure 50.

The antenna structure 50 includes a first metallic sheet 51, a second metallic sheet 53, a feed portion 55, a connecting portion 57, a coupling portion 58, and a ground portion 59. The first metallic sheet 51 is substantially parallel to the second metallic sheet 53. The connecting portion 57 and the coupling portion 58 are both positioned between the first metallic sheet 51 and the second metallic sheet 53.

In this embodiment, the first metallic sheet 51 and the second metallic sheet 53 are both a portion of a metallic housing of the wireless communication device 100 and can serve as a part of the antenna structure 50. The first metallic sheet 51 and the second metallic sheet 53 are both rectangular sheets, and are positioned at two opposite sides of the keep-out-zone 12 of the baseboard 10. A first slot g1 is defined between the first metallic sheet 51 and the housing 30. A second slot g2 is defined between the second metallic sheet 53 and the housing 30. In this embodiment, a width of the first slot g1 and a width of the second slot g2 are both about 1 mm.

The feed portion 55 is substantially in the form of a strip. The feed portion 55 is positioned on the keep-out-zone 12 and is electrically connected to the feed pin 121 for providing current to the antenna structure 50.

The connecting portion 57 includes a first connecting section 571 and a second connecting section 573. The first connecting section 571 is substantially in the form of a strip and is positioned at a plane perpendicular to a plane that the baseboard 10 is positioned. The first connecting section 571 is perpendicularly connected to an end of the feed portion 55 away from the feed pin 121. The second connecting section 573 is a rectangular sheet and is coplanar with the first connecting section 571. The second connecting section 573 is perpendicularly connected to the first connecting section 571. A first end of the second connecting section 573 extends towards the first metallic sheet 51 and is spaced apart from the first metallic sheet 51. A second end of the second connecting section 573 extends towards the second metallic sheet 53 and is perpendicularly connected to the second metallic sheet 53. That is, the first connecting section 571 is perpendicularly connected to a middle portion of the second connecting section 573, and the second connecting section 573 and the first connecting section 571 cooperatively form a T-shaped structure.

The coupling portion 58 is a substantially rectangular sheet and is positioned at a plane substantially parallel to a plane that the baseboard 10 is positioned. The coupling portion 58 is positioned between the baseboard 10 and the first metallic sheet 51 and is perpendicularly connected to an end of the second connecting section 573 adjacent to the first metallic sheet 51. The coupling portion 58 is spaced apart from the first metallic sheet 51 so that the current from the coupling portion 58 can be coupled to the first metallic sheet 51. In this embodiment, a distance between the coupling portion 58 and the first metallic sheet 51 is about 1 mm.

The ground portion 59 includes a first ground section 591 and a second ground section 593. The first ground section 591 is a substantially strip and is coplanar with the connecting portion 57. The first ground section 591 is perpendicularly connected to the first metallic sheet 51 and the keep-out-zone 12, and is parallel to the second connecting section 573. The second ground section 593 is positioned on the baseboard 10 and is parallel to the feed portion 55. A first end of the second ground section 593 is perpendicularly connected to one end of the first ground section 591 away from the first metallic sheet 51. A second end of the second ground section 593 is electrically connected to the ground pin 122 so that the antenna structure 50 can be grounded.

Figure 2:
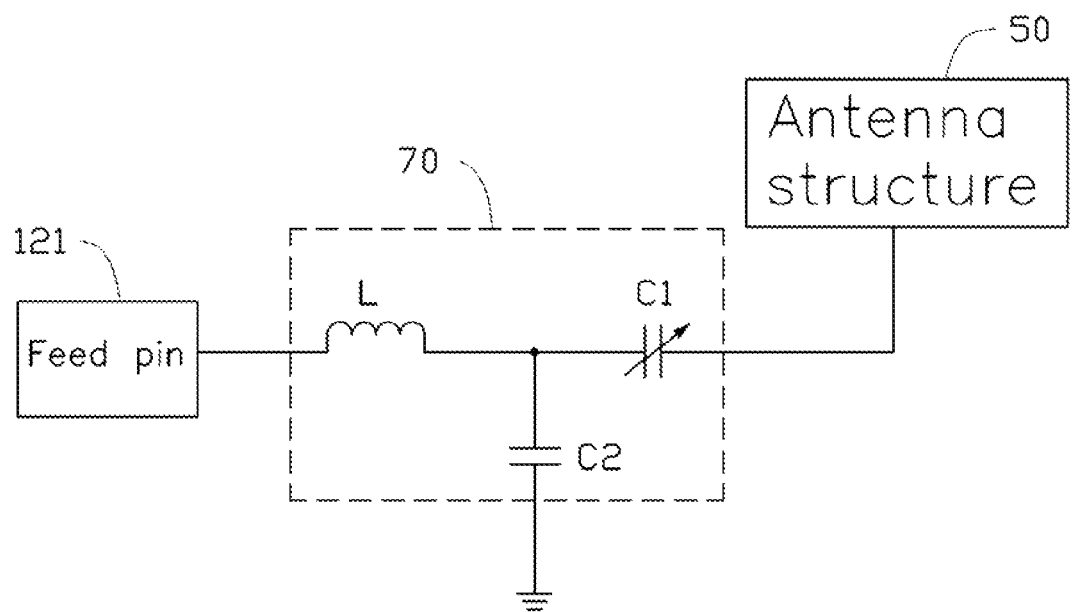
FIG. 2 is a circuit view of a matching circuit of the wireless communication device of FIG. 1.

FIG. 2 illustrates that the wireless communication device 100 further includes a matching circuit 70. The matching circuit 70 is electrically connected between the feed pin 121 and the antenna structure 50, and is configured to match an impedance of the antenna structure 50, for optimizing performance of the antenna structure 50 when the antenna structure 50 works in a low-frequency mode. In this embodiment, the matching circuit 70 includes a first capacitor C1, an inductor L, and a second capacitor C2. The inductor L and the first capacitor C1 are electrically connected between the feed pin 121 and the antenna structure 50 in series. A first end of the second capacitor C2 is electrically connected between the inductor L and the first capacitor C1, and a second end of the second capacitor C2 is grounded. An inductance value of the inductor L can be, for example, about 2 nH. The first capacitor C1 can be a variable capacitor. A capacitance value of the second capacitor C2 can be, for example, about 0.5 pF.

When current is input to the feed pin 121, the current flows to the matching circuit 70, the feed portion 55, the connecting portion 57, and the coupling portion 58. Then, a first current from the feed pin 121 is coupled to the first metallic sheet 51 via the coupling portion 58, and is grounded via the ground portion 59. A second current from the feed pin 121 flows to the second metallic sheet 53 through the connecting portion 57. Thus, the coupling portion 58, the first metallic sheet 51, the second metallic sheet 53, and the ground portion 59 cooperatively form a first current path for activating a low-frequency mode. Additionally, the current flowing to the coupling portion 58, the first metallic sheet 51, the second metallic sheet 53, and the ground portion 59 activates a first high-frequency mode and a second high-frequency mode due to frequency-doubled effect. The current flowing through the first connecting section 571 and the ground portion 59 further activates a third high-frequency mode.

In this embodiment, a central frequency of the low-frequency mode is about 850 MHz. A central frequency of the first high-frequency mode is about 1800 MHz. A central frequency of the second high-frequency mode is about 2500 MHz. A central frequency of the third high-frequency mode is about 2000 MHz.

Figure 3:
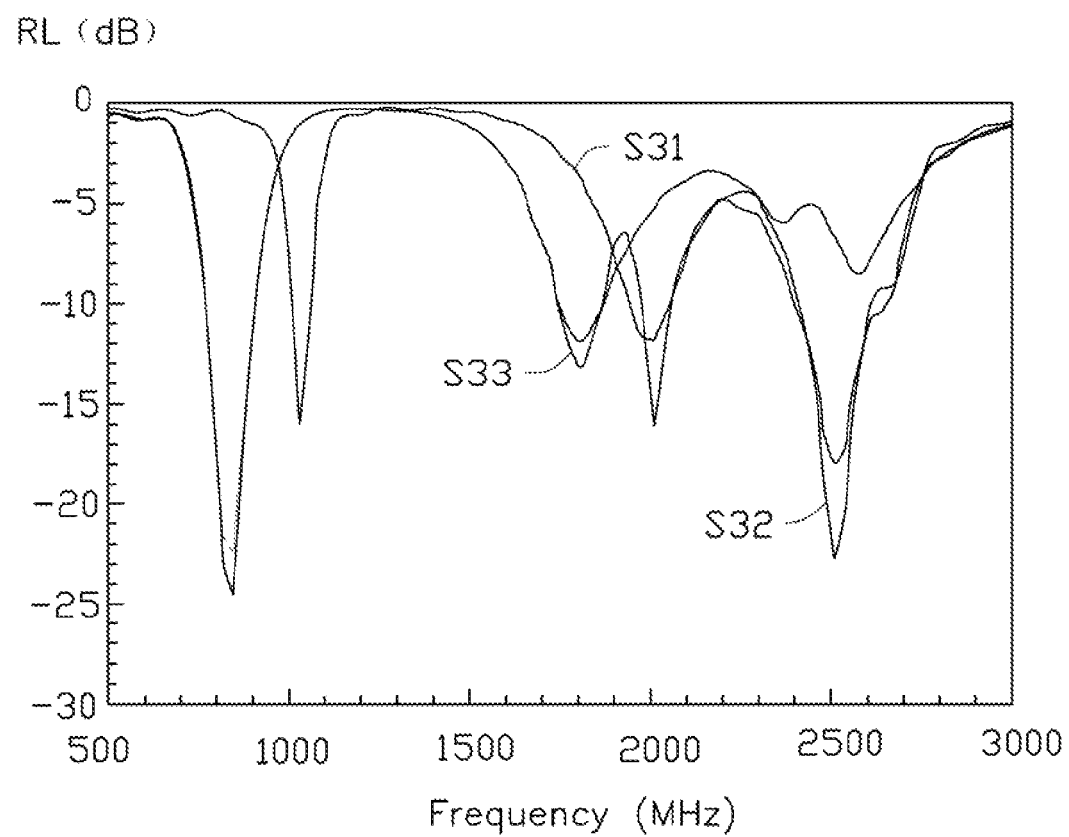
FIG. 3 is a return loss (RL) graph of the antenna structure of the wireless communication device of FIG. 1.

FIG. 3 illustrates a return loss (RL) measurement of the antenna structure 50. Curve S31 illustrates a value of the RL of the antenna structure 50 when the antenna structure 50 has no coupling portion 58. Curve S32 illustrates a value of the RL of the antenna structure 50 when the antenna structure 50 has no first connecting section 571. Curve S33 illustrates a value of the RL of the antenna structure 50 when the antenna structure 50 has the coupling portion 58 and the first connecting section 571. It can be derived from FIG. 3 that the coupling portion 58 is configured to broaden a bandwidth of the antenna structure 50. The first connecting section 571 is configured to activate the third high-frequency mode of the antenna structure 50.

Figure 4:
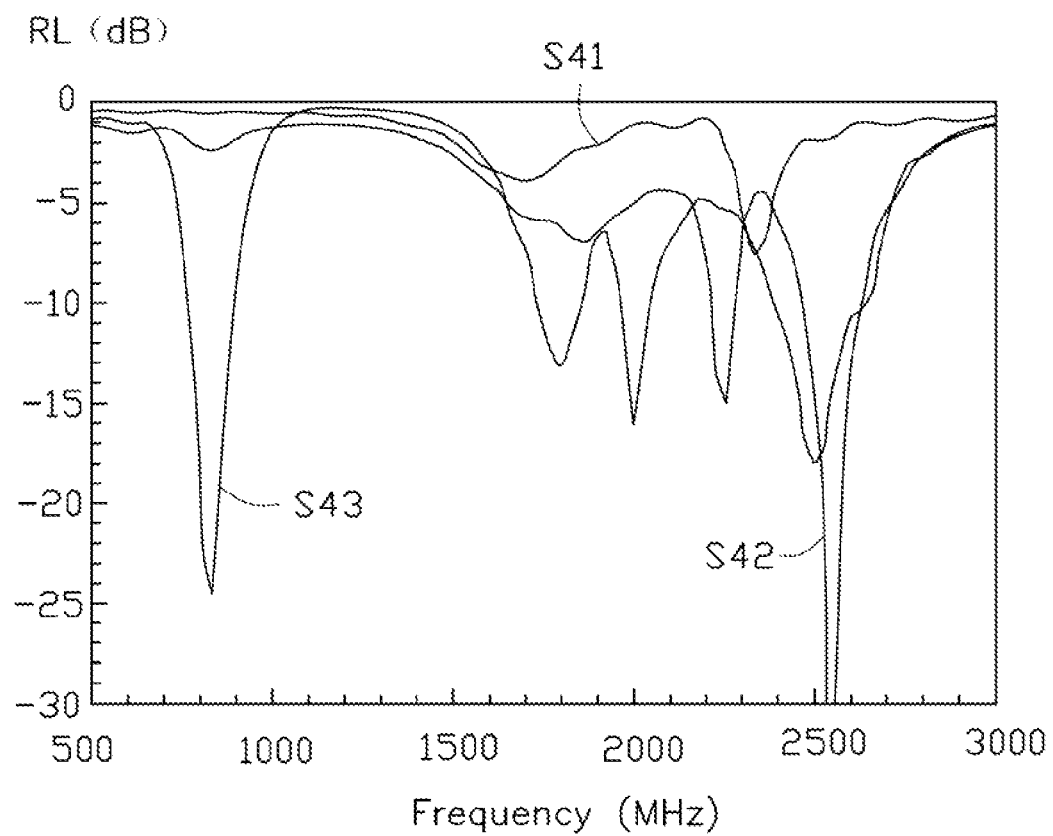
FIG. 4 is another RL graph of the antenna structure of the wireless communication device of FIG. 1.

FIG. 4 illustrates another RL measurement of the antenna structure 50. Curve S41 illustrates a value of the RL of the antenna structure 50 when the antenna structure 50 has no ground portion 59. Curve S42 illustrates a value of the RL of the antenna structure 50 when the antenna structure 50 has no second connecting section 573. Curve S43 illustrates a value of the RL of the antenna structure 50 when the antenna structure 50 has the ground portion 59 and the second connecting section 573. It can be derived from FIG. 4 that the ground portion 59 is configured to activate the low-frequency mode of the antenna structure 50. The second connecting section 573 is configured to broaden a bandwidth of the antenna structure 50 in a high-frequency mode.

Figure 5:
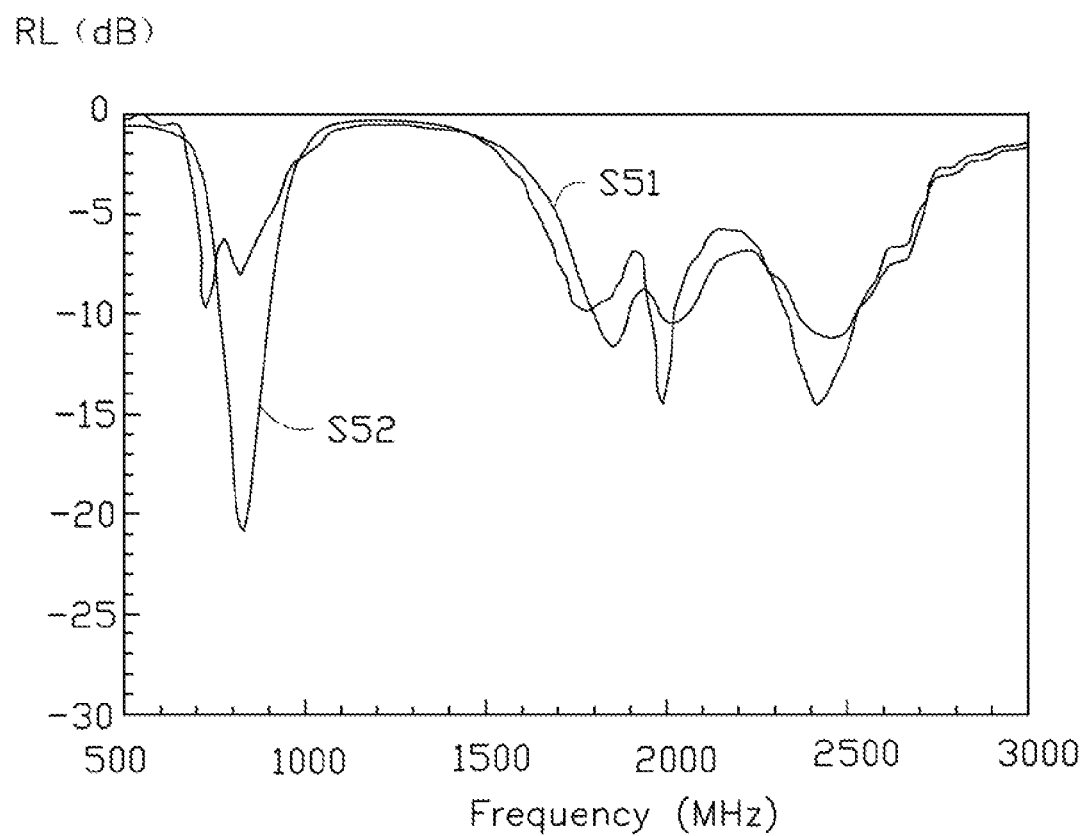
FIG. 5 is a RL graph of the antenna structure of FIG. 1, when changing a capacitance of a first capacitor of the matching circuit of FIG. 2.

FIG. 5 illustrates that when the capacitance value of the first capacitor C1 is about 4 pF, a bandwidth of the first low-frequency mode can be about 704 MHz to about 894 MHz (see curve S51). When the capacitance value of the first capacitor C1 is about 20 pF, a bandwidth of the first low-frequency mode can be about 750 MHz to about 960 MHz (see curve S52), and a bandwidth of the high-frequency mode can be about 1710 MHz to about 2690 MHz. As shown in FIGS. 3-5, the antenna structure 50 and the wireless communication device 100 employing the antenna structure 50 can be utilized in common wireless communication systems with exceptional communication quality.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An antenna structure comprising:
   a feed portion;
   a ground portion;
   a connecting portion electrically connected to the feed portion and positioned at a plane perpendicular to a plane that the feed portion is positioned;
   a first metallic sheet electrically connected to the ground portion and positioned at a plane parallel to a plane that the feed portion is positioned;
   a second metallic sheet spaced apart from and parallel to the first metallic sheet, the second metallic sheet electrically connected to the connecting portion, and the first metallic sheet and the second metallic sheet positioned at two opposite sides of the feed portion; and
a coupling portion coupled to the connecting portion, the coupling portion positioned at a plane parallel to a plane that the feed portion is positioned and positioned between the first metallic sheet and the feed portion;
wherein the connecting portion comprises a first connecting section and a second connecting section, the first connecting section is perpendicularly connected to an end of the feed portion, the second connecting section is coplanar with the first connecting section; a middle portion of the second connecting section is perpendicularly connected to the first connecting section to form a T-shaped structure with the first connecting section.

2. The antenna structure of claim 1, wherein a first end of the second connecting section extends towards the first metallic sheet and is spaced apart from the first metallic sheet; a second end of the second connecting section extends towards the second metallic sheet and is perpendicularly connected to the second metallic sheet.

3. The antenna structure of claim 2, wherein the coupling portion is perpendicularly connected to an end of the second connecting section adjacent to the first metallic sheet.

4. The antenna structure of claim 1, wherein the ground portion comprises a first ground section and a second ground section, the first ground section is coplanar with the connecting portion, the first ground section is perpendicularly connected to the first metallic sheet and is parallel to the second connecting section; the second ground section is parallel to the feed portion and is perpendicularly connected to an end of the first connecting section away from the first metallic sheet.

5. A wireless communication device comprising:
a baseboard forming a feed pin and a ground pin; and
an antenna structure positioned on the baseboard, the antenna structure comprising:
    a feed portion electrically connected to the feed pin;
    a ground portion electrically connected to the ground pin;
    a connecting portion electrically connected to the feed portion and positioned at a plane perpendicular to a plane that the feed portion is positioned;
    a first metallic sheet electrically connected to the ground portion and positioned at a plane parallel to a plane that the feed portion is positioned;
    a second metallic sheet spaced apart from and parallel to the first metallic sheet, the second metallic sheet electrically connected to the connecting portion, and the first metallic sheet and the second metallic sheet positioned at two opposite sides of the feed portion; and
    a coupling portion coupled to the connecting portion, the coupling portion positioned at a plane parallel to a plane that the feed portion is positioned and positioned between the first metallic sheet and the feed portion;
wherein the connecting portion comprises a first connecting section and a second connecting section, the first connecting section is perpendicularly connected to an end of the feed portion, the second connecting section is coplanar with the first connecting section; a middle portion of the second connecting section is perpendicularly connected to the first connecting section to form a T-shaped structure with the first connecting section.

6. The wireless communication device of claim 5, wherein a first end of the second connecting section extends towards the first metallic sheet and is spaced apart from the first metallic sheet; a second end of the second connecting section extends towards the second metallic sheet and is perpendicularly connected to the second metallic sheet.

7. The wireless communication device of claim 6, wherein the coupling portion is perpendicularly connected to an end of the second connecting section adjacent to the first metallic sheet.

8. The wireless communication device of claim 5, wherein the ground portion comprises a first ground section and a second ground section, the first ground section is coplanar with the connecting portion, the first ground section is perpendicularly connected to the first metallic sheet and is parallel to the second connecting section; the second ground section is parallel to the feed portion and is perpendicularly connected to an end of the first connecting section away from the first metallic sheet.

9. The wireless communication device of claim 5, further comprising a housing; wherein the housing surrounds the baseboard, a first slot is defined between the first metallic sheet and the housing, and a second slot is defined between the second metallic sheet and the housing.

10. The wireless communication device of claim 5, further comprising a matching circuit, wherein the matching circuit is electrically connected between the feed pin and the antenna structure for matching an impedance of the antenna structure.

11. The wireless communication device of claim 10, wherein the matching circuit comprises a first capacitor, an inductor, and a second capacitor; the inductor and the first capacitor are electrically connected between the feed pin and the antenna structure in series; a first end of the second capacitor is electrically connected between the inductor and the first capacitor, and a second end of the second capacitor is grounded.

12. The wireless communication device of claim 11, wherein an inductance value of the inductor is about 2 nH, the first capacitor is a variable capacitor, and a capacitance value of the second capacitor is about 0.5 pF.

* * * * *